(12) United States Patent
Bernegger et al.

(10) Patent No.: US 12,203,151 B2
(45) Date of Patent: Jan. 21, 2025

(54) PROCESS FOR PRODUCING BRIQUETTES FROM A WASTE MATERIAL AND BRIQUETTE MADE OF A WASTE MATERIAL

(71) Applicants: Bernegger GmbH, Molln (AT); Hatch Küttner GmbH, Essen (DE)

(72) Inventors: Kurt Bernegger, Leonstein (AT); Bernhard Hanusch, Hagen am Teutoburger (DE); Dirk Behrmann, Essen (DE); Farzad Salehi, Essen (DE); Thomas Breuer, Kaarst (DE)

(73) Assignees: Bernegger GmbH, Molln (AT); Hatch Küttner GmbH, Essen (DE)

( * ) Notice: Subject to any disclaimer, the term of this patent is extended or adjusted under 35 U.S.C. 154(b) by 0 days.

(21) Appl. No.: 17/925,000

(22) PCT Filed: May 14, 2021

(86) PCT No.: PCT/EP2021/062814
§ 371 (c)(1),
(2) Date: Nov. 13, 2022

(87) PCT Pub. No.: WO2021/229048
PCT Pub. Date: Nov. 18, 2021

(65) Prior Publication Data
US 2023/0279306 A1    Sep. 7, 2023

(30) Foreign Application Priority Data
May 14, 2020 (DE) ........................ 10 2020 206 095.9

(51) Int. Cl.
| | | |
|---|---|---|
| *C22B 9/16* | (2006.01) | |
| *C10L 5/04* | (2006.01) | |
| *C10L 5/08* | (2006.01) | |
| *C22B 1/24* | (2006.01) | |
| *C22B 15/00* | (2006.01) | |

(52) U.S. Cl.
CPC ........ *C22B 9/16* (2013.01); *C10L 5/04* (2013.01); *C10L 5/08* (2013.01); *C22B 1/24* (2013.01); *C22B 15/0054* (2013.01); *C22B 15/0056* (2013.01); *C10L 2200/0209* (2013.01); *C10L 2200/0469* (2013.01)

(58) Field of Classification Search
CPC ... C22B 1/24; C22B 15/0054; C22B 15/0056; C22B 9/16; C10L 2200/0204; C10L 2200/0209; C10L 2200/0469; C10L 2230/08; C10L 2290/02; C10L 2290/24; C10L 2290/28; C10L 2290/30; C10L 2290/52; C10L 5/04; C10L 5/08; C10L 5/361; C10L 5/40; C10L 5/44; C10L 5/46; C10L 5/48

See application file for complete search history.

(56) References Cited

U.S. PATENT DOCUMENTS

2008/0145685 A1    6/2008  Mishima

FOREIGN PATENT DOCUMENTS

| DE | 102008038966 B3 | 8/2009 | |
|---|---|---|---|
| DE | 102015011067 A1 | 4/2017 | |
| EP | 0246388 A1 | 11/1987 | |
| EP | 3026126 A1 | 6/2016 | |
| JP | 2001049357 A  * | 2/2001 | |
| KR | 20040084155 A | 10/2004 | |
| WO | 2006082658 A1 | 8/2006 | |
| WO | WO-2012019216 A1 * | 2/2012 | ................ C10L 5/14 |

OTHER PUBLICATIONS

Thomas Scientific, London, GB;, vol. 2005, No. 12, AN 2005-108888, Retrieved from: Databasse WPI [online] XP002803687 & KR 20040084155 A (Univ Hoseo Academic Coop Found) Oct. 6, 2004 (Oct. 6, 2004) abstract; claims 1,2; examples 1-4.
Naruset et al. "Application of waste plastics to electric furnace for steel making as thermal and carbon sources" Sep. 29, 2004 (Sep. 29, 2004), pp. 145-154, Waste Management in Japan Waste Management in Japan; Second International Conference on Waste Management and the Environment Held in Rhodes, Greece From Sep. 29-Oct. 1, 2004, Witpress, GB.
Thomas Scientific, London, GB; , vol. 2006, No. 61, AN 2006-594598, Retrieved from; Database WPI [online] XP002803688.
International Search Report, PCT/EP2021/062814, dated Jul. 27, 2021.
Thomas Scientific, London, GB; AN 2001-232624 XP002803714, & JP 2001 049357 A (Kiryu Kikai KK) Feb. 20, 2001 )Feb. 20, 2001 Zusammenfassung Apr.

* cited by examiner

*Primary Examiner* — Latosha Hines
(74) *Attorney, Agent, or Firm* — FisherBroyles, LLP

(57) ABSTRACT

A method for producing briquettes made of a waste material includes provisioning of at least one metal and at least one organic material. The waste material is mechanically prepared in a single or multiple stages and at least one first fraction of the waste material is separated. A briquette mixture containing the at least one first fraction is produced, wherein the at least one first fraction has a calorific value of 0 MJ/kg to 30 MJ/kg. A calorific value of the briquette mixture is adjusted by varying at least the first fraction. The briquette mixture is introduced into a briquetting device and pressed into briquettes. Briquettes with a calorific value of 5 MJ/kg to 30 MJ/kg and with a maximum copper content of 0.1 wt % to 20 wt % are produced.

20 Claims, 2 Drawing Sheets

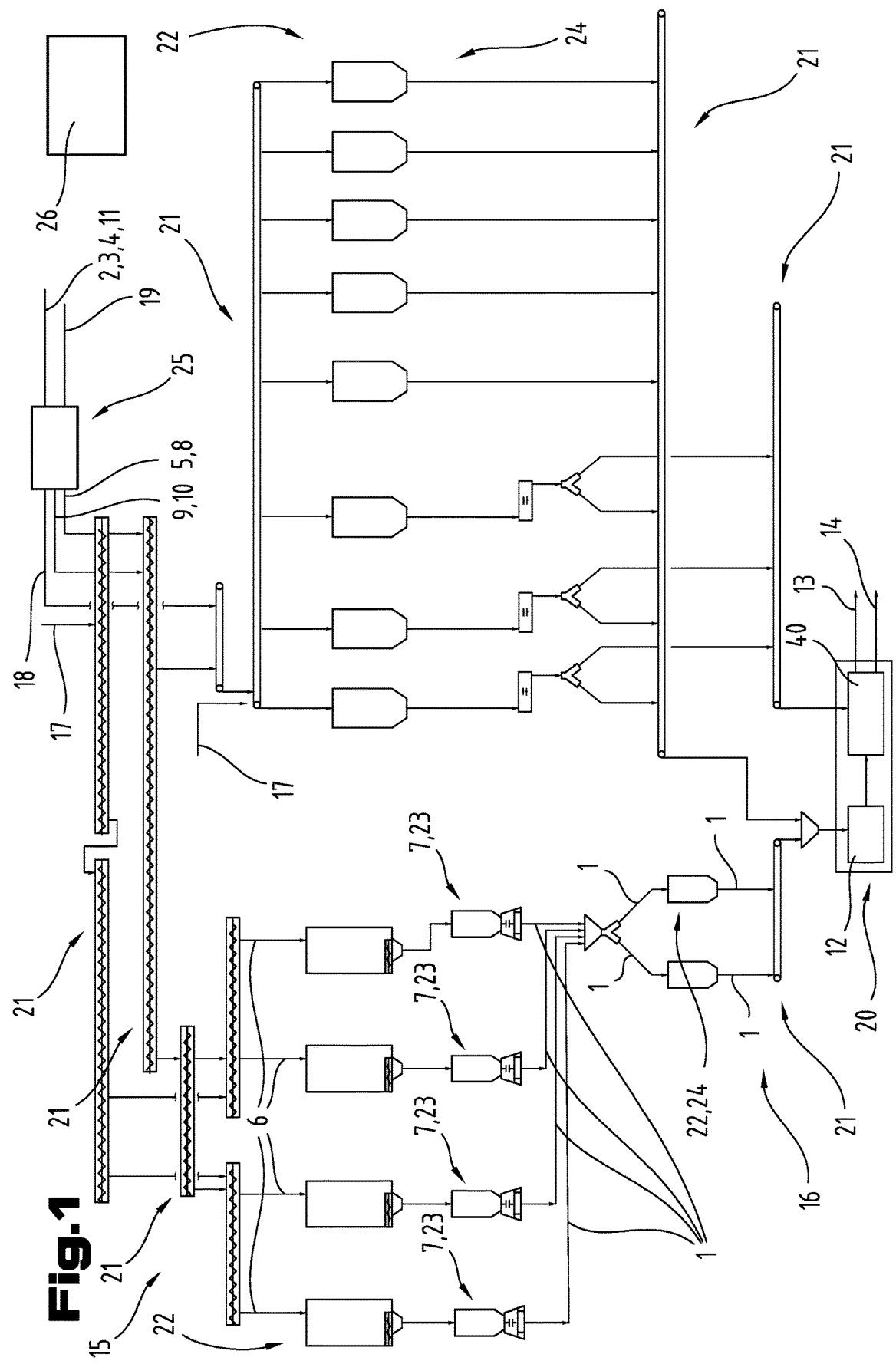

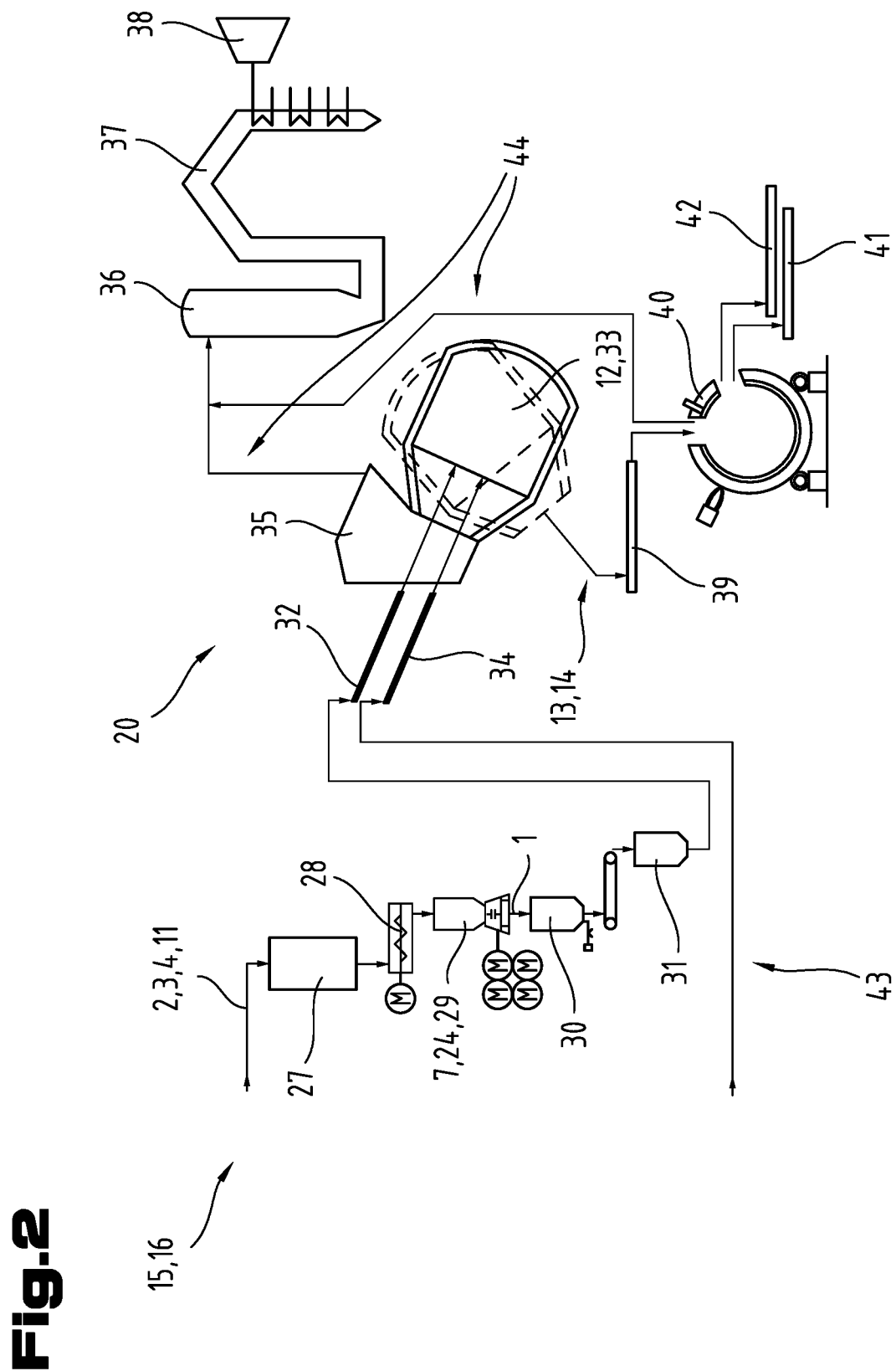

PROCESS FOR PRODUCING BRIQUETTES FROM A WASTE MATERIAL AND BRIQUETTE MADE OF A WASTE MATERIAL

CROSS-REFERENCE TO RELATED APPLICATIONS

This application is a National Stage Patent Application of International Patent Application No. PCT/EP2021/062814, filed May 14, 2021, which claims the benefit of German Application Serial No. 10 2020 206 095.9, filed May 14, 2020, the contents of each are incorporated by reference in their entireties.

TECHNICAL FIELD

The disclosure relates to a method for producing briquettes from a waste material, as well as to a briquette made of a waste material and to the use of such a briquette in a reactor.

BACKGROUND

Waste materials of different kinds can be mechanically prepared and divided into reusable and/or recyclable fractions, for example in shredder plants. The fractions thus produced, namely the shredder light fraction (SLF) and the shredder heavy fraction (SHF) can be separated into fluxes of recyclables, which are subsequently prepared and therefore fed back into a recycling loop in the course of preparation processes.

However, there will always remain residues from the SLF and SHF which have a relatively low content of reusable material, in particular with a low metal content. Preparation processes for preparing these shredder residues are known to those working in the field. However, these methods are only slightly satisfactory from an economic perspective. This is in particular also true because the quality and contents of the composition of the shredder residues vary greatly. For this reason, shredder residues, most of the time, are either combusted in a thermal recovery plant (TVA) or deposited.

So far, especially shredder light fractions as an example of residues from shredder plants which contain heavy metals or other waste material having a high content of organic and mineral ingredients and a low content of metal ingredients are disposed of in the construction of waste disposal sites, as backfilling material or in waste incineration plants. However, it is not possible to recover and reuse sometimes valuable ingredients of this waste in this manner.

These solutions are not, however, in accordance with an economically sustainable system and therefore only partially satisfactory, all the more as, when incinerated and deposited, metals, which must otherwise be mined by effortful primary extraction, will be permanently lost for re-feeding into a recycling loop.

In order to be able to reuse raw materials contained in such waste material in part or, where possible, in full, it is necessary to selectively segregate these raw materials from the waste material in as pure a condition as possible, which particularly applies to heavy metals, in particular noble metals, in order to re-feed the raw materials into the materials cycles. The disposal methods used so far, in particular waste incineration plants, are unsuitable for this task. Due to its structure, the result of waste incineration does not enable separation of its ingredients.

While methods for recovering metals from primary and also secondary sources of raw materials in metallurgical plants are generally known, the known methods do not enable processing waste fractions with large input fluxes and relatively low metal contents in an ecologically and economically satisfactory manner. This applies in particular whenever the small quantities of contained metal and/or metals are fine material. In particular small-grain, strongly intergrown residues with a low metal content, e.g. from preparing shredder residues from preparing used electric or electronic appliances (so-called tertiary waste, i.e. waste which forms the residue and/or remainder which remains after a multi-stage preparation operation), can currently not be recovered in a satisfactory manner.

OVERVIEW

It was the object of the present disclosure to overcome the disadvantages of the prior art and to make available method for producing briquettes from a waste material and a briquette having properties which enable an ecological preparation and, further, an economic recovery of reusable materials.

This object is achieved by means of a method, of a briquette and of the use of a briquette in accordance with the claims.

The disclosure relates to a method for producing briquettes from a waste material. In accordance with the method, a waste material is provisioned, which waste material comprises at least one metal and at least one organic material. The waste material may be residues from a mechanical preparation operation which contain at least one metal, for example residues from preparing electric and electronic scrap or shredder residues. The organic material may be, for example, any kinds of plastics, any non-compostable organic material, but also any kinds of cellulose-containing materials such as wood, or also natural fibers. The organic material may also be, for example, epoxy resin, which can be a component of electronic scrap.

Furthermore, the waste material is mechanically prepared in a single or multiple stages and at least one first fraction of the waste material is separated. The first fraction can be a fraction of shredder residues with a relatively low content of reusable material. Due to the small-grain, intergrown properties of the reusable material and/or of the at least one metal, the first fraction differs from the properties of the metals contained in a shredder light fraction or in a shredder heavy fraction.

In another method step, a briquette mixture containing the at least one first fraction is produced. The at least one first fraction has a calorific value of 0 MJ/kg to 30 MJ/kg.

A calorific value of the briquette mixture is adjusted by varying the quantity of the at least one first fraction. In the course of this process, the desired and/or required calorific value can be continuously adapted and/or varied, so that briquettes with a calorific value suited, or even ideal, for a subsequent processing process and/or combustion process can be produced from the briquette mixture at all times. It may be expedient in this context if the calorific value of the briquette mixture is measured and/or checked at suitable, continuous or discontinuous, intervals. This can be done, for example, by means of a central control, regulation and measurement system.

The briquette mixture is introduced into a briquetting device and the briquette mixture is pressed into briquettes, so that briquettes with a calorific value of 5 MJ/kg to 30 MJ/kg and with a maximum copper content of 0.1 wt % to 20 wt % are produced. The briquetting device may generally be a machine and/or plant according to the prior art, wherein briquettes with different geometries, for example round briquettes, briquettes having a hole, cylindrical briquettes etc., can be produced. As it is well-known to those working in the field that the term "briquette" refers to moldings compacted from small-grain material, a detailed definition will not be presented in this context. It may be expedient, also in this context, if the quality, i.e. in particular the calorific value and the copper content, are measured and/or checked at suitable, continuous or discontinuous, intervals. Such an ongoing quality control can be done, for example, with the help of a control, regulation and measurement system.

It should be mentioned in this context that the individual method steps and their chronological sequence need not necessarily take place in the specified order, but also a different chronological sequence is possible. Preferably, however, the specified method steps take place in a successive, and therefore sequential, chronological sequence.

The disclosure in accordance with the method has the advantage that briquettes are produced which have a defined calorific value and a defined chemical composition and a defined content of reusable material, namely a defined copper content, so that the briquettes meet the requirements, according to the method, of any subsequent preparation process in the best possible manner and/or can be processed in such a subsequent preparation process in the best possible manner. Because the precise composition and quality of the briquettes are known and because the calorific value of the briquette mixture can be adjusted and/or adapted, the briquettes can be used in a controlled, process-reliable and therefore most economical manner in any subsequent preparation and/or melting process. In particular if the first fraction is composed predominantly of small-grain material and is subsequently provided for preparation, for combustion and/or for melting in a reactor, a processing of the first fraction into briquettes may be advantageous. This is also the case because briquettes are simple to handle and also disposable in a simple manner. In comparison with an unbriquetted first fraction, briquettes can, in particular, be introduced into the reactor in a dust-reduced manner and consequently remain in the process area.

Furthermore, it may be expedient if the at least one first fraction is provisioned as a fine fraction or comprising a fine fraction, which fine fraction has predominantly components with a maximum grain size of less than 15 mm, preferably of less than 10 mm. It is generally conceivable that the at least one first fraction consists not merely of a single fraction, namely of a single fine fraction, but can generally also be a mixture of multiple fractions. The term "fine fraction" is known in the mechanical preparation of waste material and refers to a fraction of sand and fine material produced in the course of a single or multi-stage mechanical waste preparation operation. The fine fraction is therefore, most of the time, a mixture of, for example, glass, small-grain iron, thin copper cables, lead and zinc-containing dusts, plastic particles, lint as well as lacquer residues. The fine fraction is usually relatively light-weight and therefore requires large amounts of space for storage and transport. Usually, the calorific value of the fine fraction is in the range of 5 MJ/kg+/−5 MJ/kg. Further, the fine fraction can comprise a high content of oxidic materials, which may serve as slag formers in any subsequent melting process. The fine fraction can have an iron content of up to 20 wt %. Further, the fine fraction can have a content of non-ferrous metals (e.g. copper, zinc, gold etc.) of up to 5 wt %. In accordance with the classification of the Austrian List of Wastes Ordinance and/or in accordance with item 5 of table 1 of the ÖNORM S 2100 "List of Wastes," the fine fraction falls among code number SN 91103 for residues from mechanical preparation. This classification analogously applies to this kind of material also outside of Austria and even if the material is not classified as waste material.

Yet it may also be the case that the at least one first fraction is provisioned as a lint fraction. The term "lint fraction" or "lint" is known in the mechanical preparation of waste material and refers to a mixture of light-weight, porous and/or fibrous raw materials (textile fibers, foams, wood and/or cellulose, foils . . . ) produced in the course of a single or multi-stage mechanical waste preparation operation. Usually, the calorific value of the lint fraction is in the range of 22.5 MJ/kg+/−10 MJ/kg and is therefore considerably higher than the calorific value of the fine fraction most of the time. It may also be the case that the lint fraction contains compounds of lead, zinc and/or chlorine. The lint fraction can have an iron content of up to 6 wt %. Further, the plastic fraction can have a content of non-ferrous metals (e.g. copper, zinc, gold etc.) of up to 5 wt %. In accordance with the classification of the Austrian List of Wastes Ordinance and/or in accordance with item 5 of table 1 of the ÖNORM S 2100 "List of Wastes," the fine fraction falls among code number SN 91103 for residues from mechanical preparation. This classification analogously applies to this kind of material also outside of Austria and even if the material is not classified as waste material.

It may further be provided that at least one second fraction is added to the briquette mixture, which second fraction has a calorific value which is different from the first fraction. Advantageously, the first and the second fraction can have predominantly small-grain components.

For example, the at least one second fraction can be a plastic fraction, such as a plastic fraction from a shredder plant, for example. Usually, a plastic fraction comprises solid and lumpy material and/or rounded fragments from a mechanical preparation operation of waste material according to the method. Usually, the calorific value of the plastic fraction is in the range of 18.5 MJ/kg+/−10 MJ/kg. It may also be the case that the plastic fraction contains a high content of chlorine compounds. The plastic fraction can have an iron content of up to 5 wt %. Further, the plastic fraction can have a content of non-ferrous metals (e.g. copper, zinc, gold etc.) of up to 5 wt %. The use of a plastic fraction as a second fraction can facilitate and render more flexible an adjustment of the calorific value of the briquette mixture.

It may furthermore be provided that the second fraction is a lint fraction or comprises a lint fraction. It is generally conceivable that the second fraction consists not merely of a single fraction, namely of a single lint fraction, but can generally also be a mixture of multiple fractions. The use of a lint fraction as a second fraction, in addition to the fine fraction as a first fraction, can facilitate and render more flexible an adjustment of the calorific value of the briquette mixture.

Also advantageous is an embodiment in accordance with which it may be provided that the waste material comprises at least one mineral material. In particular if the briquettes which are produced from the waste material are oxidized and/or combusted in a reactor, in particular in a melting furnace, a content of mineral material can be advantageous. The existence of mineral in the waste material can facilitate the formation of a slag phase with suitable viscosity in a reactor and therefore have a positive influence on an isolation operation from a metal phase.

In accordance with one advancement, it is possible that the briquettes are produced with a calorific value of 8 MJ/kg to 25 MJ/kg, preferably of 11 MJ/kg to 18 MJ/kg. This calorific value has proven particularly expedient for a precise and efficient process control in a reactor, as an autothermal combustion, i.e. a combustion without adding additional fuels, is facilitated.

It may further be expedient if the briquettes are produced with a maximum copper content of 0.3 wt % to 10 wt %, preferably of 0.5 wt % to 3 wt %. This copper content has proven particularly expedient for a precise and efficient process control in a reactor.

It may furthermore be provided that the briquettes are heated or cooled after pressing. Depending on the composition and properties of the briquettes, a heating or cooling operation can have a positive effect on the dimensional stability and strength of the briquettes.

It may furthermore be provided that the briquettes are, continuously or discontinuously, placed from the briquetting device into a reactor. This can be done both directly, i.e. virtually in-line, or via an intermediary storage and/or transport step.

In accordance with a particular embodiment, it is possible that the briquette mixture is composed such that the calorific value of the waste material contained therein is so high that the at least one metal contained therein is melted in a combustion in the reactor during an ongoing process together with other briquettes without adding other fuels or without energy input. This enables an autothermal reaction and facilitates a precise and efficient process control in a reactor. Yet it may also be the case that, in addition to the briquettes, an additional coarse fraction is added into the reactor, wherein a calorific value of this material is so high that the at least one metal contained therein is melted in a combustion in the reactor during an ongoing process together with other briquettes without adding other fuels or without energy input. A coarse fraction of the waste material may be, for example, a fraction from a shredder presorting process which contains relatively high contents of metals, in particular of non-ferrous heavy metals. A coarse fraction may be, for example, electronic scrap, used metal and/or a plastic fraction.

In accordance with an advantageous advancement, it may be provided that a composition of the briquette mixture, or the calorific value of the briquette mixture, is adapted continuously to process parameters of the reactor. Process parameters are, for example: the temperature in a post-combustion plant downstream of the reactor, the oxygen content of the process gas in the reactor or in a post-combustion plant and/or the waste gas composition of the process gas in the reactor or in a post-combustion plant.

Yet, independent of this, the object of the disclosure is also achieved by means of a briquette made of a waste material. The waste material comprises at least one metal and at least one organic material. The briquette is preferably produced using a method according to any one of the claims. In this context, it is provided that the briquette is produced from a briquette mixture containing at least one first fraction of the waste material, which at least one first fraction has a calorific value of 0 MJ/kg to 30 MJ/kg and that the briquette has a calorific value of 5 MJ/kg to 30 MJ/kg and a maximum copper content of 0.1 wt % to 20 wt %. To avoid unnecessary repetition, reference is made to the above description and advantages.

The briquette in accordance with the disclosure has the advantage that it has a defined calorific value and a defined content of reusable material, namely a defined copper content. Because the composition and quality of the briquettes are precisely defined and known, the briquette can be used together with other briquettes in a controlled, process-reliable and therefore most economical manner in any subsequent preparation and/or melting process. In particular if the first fraction is composed predominantly of small-grain material and is subsequently provided for preparation, combustion and/or melting in a reactor, a processing of the first fraction into briquettes may be advantageous. This is also the case because briquettes are simple to handle and also disposable in a simple manner. In comparison with an unbriquetted first fraction, briquettes can, in particular, be introduced into the reactor in a dust-reduced manner and consequently remain in the process area. Because calorific value and content of reusable material are precisely defined, a content of slag-forming components can therefore also be precisely adjusted, which can have an equally advantageous effect on any subsequent preparation and/or melting process.

It may further be provided that the at least one first fraction is a fine fraction or comprises a fine fraction, which fine fraction has predominantly components with a maximum grain size of less than 15 mm, preferably of less than 10 mm.

It may furthermore be provided that the briquette mixture contains a second fraction, which second fraction has a calorific value which is different from the first fraction.

Also advantageous is an embodiment, in accordance with which it may be provided that the second fraction is a lint fraction or comprises a lint fraction.

In accordance with one advancement, it is possible that a proportion of fine fraction to lint fraction is a maximum of 0.1 to 6, preferably a maximum of 0.3 to 5, particularly preferably a maximum of 0.5 to 3. A briquette produced with these mixing ratios has ideal properties for combustion and/or for melting in a reactor, in particular in a melting reactor. These properties include, among others, the calorific value, the content of reusable materials, in particular the content of metal and/or of copper and also the viscosity of the molten mass.

It may further be expedient if the waste material comprises at least one mineral material.

It may moreover be provided that the briquette has a calorific value of 8 MJ/kg to 25 MJ/kg, preferably of 11 MJ/kg to 18 MJ/kg.

It may furthermore be provided that the briquette has a maximum copper content of 0.3 wt % to 10 wt %, preferably of 0.5 wt % to 3 wt %.

In accordance with a particular embodiment, it is possible that the briquette mixture is composed such that the calorific value of the waste material contained therein is so high that the at least one metal contained therein is melted in a combustion in a reactor during an ongoing process together with other briquettes without adding other fuels or without energy input.

In accordance with an advantageous advancement, it may be provided that the waste material contains at least one other metal and that an overall content of metals in the briquette mixture is a maximum of 35 wt %, preferably is a maximum of 25 wt %, particularly preferably is a maximum of 20 wt %. Alternatively, it may be advantageous if an overall content of metals consisting of copper and metals which are nobler than copper in accordance with the periodic table of elements is a maximum of 25 wt %, particularly preferably is a maximum of 15 wt %, particularly preferably is a maximum of 10 wt %. Because the metal content of the waste material is low in comparison with the metallurgical preparation of primary and secondary raw materials, briquettes can be provisioned with a high calorific value. These are particularly well-suited for a caloric use of the waste heat during the briquette combustion.

In particular, it may be advantageous if the briquette is thermostable up to a temperature of 400° C. In this context, "thermostable" shall mean that the briquette is stable for a sufficiently long period of time to be stored, transported and supplied to a reactor, and yet not too stable, so that the briquette disintegrates, combusts and melts quickly in the reactor. This can be ensured with the specified temperature.

It may further be provided that the briquette is, preferably at least essentially, cylindrically shaped and that a length and a diameter of the briquette are, at least essentially, identical, or that the briquette is, preferably at least essentially, cubically shaped and that a length and a width of the briquette are, at least essentially, identical. The side length(s) of the briquette and/or the diameter of the briquette can be from 10 mm to 200 mm, preferably from 20 mm to 150 mm, particularly preferably from 50 mm to 120 mm. It may also be advantageous if a proportion of length of the briquette to diameter of the briquette and/or of length of the briquette to the width of the briquette is a maximum of 0.3 to 5, preferably a maximum of 0.5 to 3, particularly preferably a maximum of 0.7 to 2.

Independent of this, the object of the disclosure also achieved by means of the use of a briquette in a reactor for melting into at least one liquid slag phase and into at least one liquid metal-containing phase. The briquette is a briquette according to any one of the claims, and/or the briquette was produced using a method according to any one of the claims. To avoid unnecessary repetition, reference is made to the above description and advantages.

The present disclosure relates to a method for processing a waste material which contains metal and other substances, in particular if it is in the form of lint or suchlike, for example shredder light fractions, in order to recover the metal.

Against this background, it is one object of the present disclosure to provision a method for processing waste material which contains metal and other substances, in particular if it is in the form of lint or suchlike, for example shredder light fractions, which method is suited for recovering the valuable metals.

This object is achieved by means of the method. Advantageous designs of the disclosure result from the sub-claims.

In such a method for processing waste material containing metal and other substances for recovering the metal, the waste material is compacted into briquettes, subsequently introduced into a melting reactor and melted into at least two phases in the melting reactor.

Generally, the use of melting reactors in which waste material can be melted in order to produce different phases which contain individual raw materials selectively or combined into groups of raw materials is known.

Yet, to operate such melting reactors, it is required to determine and adjust, as precisely as possible, the composition of the reacting material, including air. This was previously impossible for shredder light fractions or similarly structured waste material with a high content of organic and mineral ingredients and a low content of metal ingredients.

The compacting into briquettes initially enables a continuous charging into the melting reactor at a defined charging rate. Moreover, the compacting into briquettes enables the conversion reactions of the waste material in the melting reactor to take place in good and securely controllable conditions. In other words, the compacting into briquettes enables a precise adjustment of the materials introduced into the melting reactor, in particular the mix of materials required for an autothermal reaction, and therefore of the reaction mixture of waste material, pyrolysis gases and air, inside the melting reactor. This ensures, in an efficient and easily controllable manner, the correct proportions of the individual reaction partners to one another, in particular the proportion of waste material to air, in the melting reactor. The method in accordance with the disclosure enables a large portion of the energy contained in the waste material to be used during melting by means of an autothermal melting reaction without having to relinquish the possibility of recovering the metal equally contained in the waste material. This means that it can be recovered in a particularly energy-efficient manner. Further, in addition to recovering the metal, in particular non-ferrous and noble metals, the mineral content optionally contained in the waste material, for example a mineral fraction of shredder light fractions, can be recycled.

The briquettes are preferably produced by compacting the waste material in a press configured as a piston compressor. Such a device, also referred to as a briquetting press, is generally known. In comparison with other options of compacting the waste material, this is possible to do, easily and reliably, even for large quantities and during continuous operation.

Preferably, the metal of the waste material comprises copper, lead, tin, zinc, nickel and iron as well as noble metals. For these metals, the method described herein can be carried out reliably, but also other metals can be recovered in the manner described herein for the recovery from the waste material.

Preferably, the other substances of the waste material comprise organic and/or mineral substances. Particularly preferably, the waste material comprises a high content of organic and mineral ingredients as well as a low content of metal, in particular heavy-metal, ingredients. These kinds of waste material can be processed particularly reliably and advantageously using the method described herein.

Preferably, the briquettes are recycled autothermally in the melting reactor by adding air, so that hot process gases are generated. The compacting of the waste material into briquettes is particularly advantageous here because the briquettes facilitate considerably the continuous and, in terms of its rate, precisely-measured charging of the waste material into the melting reactor over methods which do not introduce the waste material into the melting reactor in another form. This means that the reaction partners can be composed in such a way that no additional energy input is required for the reaction.

The hot process gases generate steam, preferably at least partially in a heat recovery boiler. The steam can be supplied, for example, to a steam turbine for power generation or suchlike. Yet the hot process gases, in particular their thermal energy, can also be used in a different manner, for example in a remote district heating plant.

The hot process gases can further, at least partially, contribute to the waste material being melted in the melting reactor by supplying their thermal energy to the reaction. This means that the hot process gases ensure the melting of the metal and mineral components in the waste material.

Advantageously, a suitable control of the atmosphere in the melting reactor results in a production of a slag phase which is poor in, preferably essentially free from, valuable metal, in particular poor in, preferably essentially free from, copper, lead, tin, zinc, nickel, iron and/or noble metals. The slag phase is deemed poor in valuable metal if it contains 0.7 wt % or less of the valuable metal. The slag phase is deemed essentially free from valuable metal if it contains 0.5 wt % or less of the valuable metal. In addition, a liquid metal phase, in particular a liquid copper phase, is produced, which is enriched with other heavy metals, in particular with lead, tin, zinc, nickel as well as noble metals. The slag phase and enriched liquid copper phase allow a relatively simple selective recovery of the individual ingredients of the waste material. The atmosphere in the melting reactor can be controlled particularly easily, in particular continuously, by supplying the waste material in the form of briquettes.

Preferably, the melted waste material is transferred into a separation furnace, in which a separation, in particular a gravimetric separation, of slag phase and metal phase takes place.

Independent of this, the object is also achieved by means of an industrial plant which is configured for carrying out a method for processing waste material containing metal and other substances for recovering the metal. The industrial plant comprises a press, preferably configured as a piston compressor, for compacting the waste material into briquettes and a melting reactor for melting the briquettes into at least two phases.

Other advantages and advancements of the disclosure result from the entirety of the claims and from the detailed description below.

DESCRIPTION OF THE FIGURES

For the purpose of better understanding of the disclosure, it will be elucidated in more detail by means of the figures below.

These show in a respectively very simplified schematic representation:

FIG. 1 illustrates a schematic method flow chart of a briquetting plant,

FIG. 2 illustrates a simplified schematic representation of a briquetting plant system, in which a preferred method can be carried out.

DETAILED DESCRIPTION OF THE EMBODIMENTS

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, these specifications of location are to be analogously transferred to the new position.

The term "in particular" shall be understood below to mean that it can be a possible more specified embodiment or narrower specification of an object or of a method step but need not necessarily represent a mandatory, preferred embodiment of same or a mandatory procedure.

In their present use, the terms "comprising," "comprises," "having," "includes," "including," "contains," "containing" and any variations of these shall cover a non-exclusive inclusion.

FIG. 1 shows a schematic method flow chart of the most important method steps and fluxes of material. It should be understood that not all plant parts and fluxes of material shown and/or described below are mandatorily required. Further, in addition to the plant parts and fluxes of material shown and/or described below, additional ones may be provided.

The method shown in FIG. 1 and/or the briquette 1 produced therein essentially comprises two main plant areas—a briquetting plant 15 for producing briquettes with one or multiple briquetting devices 7 and a charging plant 16 for charging a subsequent reactor plant 20. Further, a waste preparation plant 25 for preparing and presorting the waste material 2 can be provided, which waste preparation plant 25 can be incorporated in the overall plant, or also be structurally independent.

In the exemplary embodiment represented, the briquetting plant 15 and the charging plant 16 are configured structurally integrated in an overall plant. The overall plant is essentially fed via a main conveying route for additives 17 and a main conveying route for the waste material 2. The briquetting plant 15 and the charging plant 16 serve the production of briquettes 1, and optionally also the storage, mixture and provision of lumpy material, in particular a coarse fraction 18 from the waste material 2 or from another and/or additional waste material 19. A coarse fraction of the waste material may be, for example, a fraction from a shredder presorting process which contains relatively high contents of metals, in particular of non-ferrous heavy metals. A coarse fraction of another waste material 19 may be, for example, electronic scrap, used metal and/or a plastic fraction. In accordance with the example shown, a flux of material comprising the briquettes 1, and optionally other components such as a coarse fraction 18, can be, continuously or discontinuously, supplied from the overall plant to a reactor plant 20 having a reactor 12. Yet it may also be the case—as is, however, not shown in the figures—that the production of the briquettes 1 takes place in a structurally, or also spatially, separate briquetting plant 15 and that the briquettes 1 are merely stored in the subsequent charging plant 16 and, from there, conveyed to the reactor plant 20 as and when needed. A charging plant 16 can also be configured as a component of a reactor plant 20.

The briquetting plant 15 and charging plant 16 comprise a plurality of conveying means 21 and storage means 22, for example conveyor screws, sieves, pipes, surge bunkers, silos, one or multiple briquetting device(s) 7, for example configured as (a) briquetting press(es) 23, one or multiple container(s) equipped with load cells 24, as well as conveyor belts. The load cells 24 enable a precisely-dosed charging of the reactor plant 20 and/or of the reactor 12 with the briquettes 1. To that end, also the storage silos for the coarse fraction 18 and also for additives 17 can be configured with load cells 24.

The method shown in FIG. 1 initially provides a provisioning of a waste material 2, which waste material 2 comprises at least one metal 3, in particular copper, and at least one organic material 4. The waste material 2 can further comprise at least one mineral material 11. The waste material 2 can also contain at least one other metal, wherein an overall content of metals in the briquette mixture 6 is a maximum of 35 wt %, preferably is a maximum of 25 wt %, particularly preferably is a maximum of 20 wt %. Alternatively, it may be the case that an overall content of metals consisting of copper and metals, which metals are listed as nobler than copper in accordance with the periodic table of elements, is a maximum of 25 wt %, preferably is a maximum of 15 wt %, particularly preferably is a maximum of 10 wt %.

Subsequently, the waste material 2 is mechanically prepared in a single or multiple stages. In particular, these two steps can take place in a waste preparation plant 25, for example in a shredder plant. A waste preparation plant 25 can also be configured structurally or spatially separate from the briquetting plant 15 and from the charging plant 16. The waste preparation plant 25 can also serve the preparation of another waste material 19. In addition to the first fraction 5, also the second fraction 9 can be produced in the waste preparation plant 25. Of course, it would also be conceivable if the waste preparation plant 25 is part of the overall plant. Further, in the waste preparation plant 25 and/or in the briquetting plant 15, at least one first fraction 5 is separated from the waste material 2. The fluxes of material represented in FIG. 1—as mentioned initially—are to be understood as merely schematic and exemplary. Depending on the kind of waste material 2 and separation in the waste preparation plant 25, it may be expedient that the briquetting plant 15 is configured with one or multiple sieves or conveyor screws, which can serve a sufficient separation of the fluxes of material. The arrangement of conveying means 21 and/or conveyor screws shown in FIG. 1 is to be understood as merely exemplary. The actual arrangement of the conveying means 21 depends on the kind and properties of the material to be transported and rests on the skill of the person skilled in the art. Yet it may also be the case—as is, however, not shown in the figures—that not the briquetting plant 15, but the waste preparation plant 25 is configured with one or multiple sieves or conveyor screws, which can serve a sufficient separation of the fluxes of material.

Subsequently, i.e. as represented subsequent to the waste preparation plant 25 and/or to the conveying means 21 configured as conveyor screws, a briquette mixture 6 containing the at least one first fraction 5 is produced, wherein the first fraction 5 has a calorific value of 0 MJ/kg to 30 MJ/kg. In this context, a calorific value of the briquette mixture 6 is produced by varying at least the first fraction 5. Such a variation can be done, for example, by means of the conveying means 21. The at least one first fraction 5 can be provisioned as a fine fraction 8, which fine fraction 8 has predominantly components with a maximum grain size of less than 15 mm, preferably of less than 10 mm. Further, at least one second fraction 9 can be added to the briquette mixture 6, which at least one second fraction 9 has a calorific value which is different from the first fraction 5. The second fraction 9 can equally originate from the waste preparation plant 25. The second fraction 9 can be a lint fraction 10. A proportion of fine fraction 8 to lint fraction 10 is a maximum of 0.1 to 6, preferably a maximum of 0.3 to 5, particularly preferably a maximum of 0.5 to 3.

Both the fractions 5, 9 for the briquette mixture 6 and the ready-mixed briquette mixture 6 are stored in suitable storage means 22, for example in silos. Further, the briquette mixture 6 is conveyed to the briquetting devices 7 and/or to the briquetting presses 23 by means of the conveying means 21. The briquetting presses 23 can be configured, for example, as piston compressors and/or as extruders with eccentric drives. In this context, FIG. 1 shows, by way of example, four briquetting presses 23, wherein the actual number depends on the plant size and/or plant capacity, of course. The briquetting presses 23 can be operated in parallel, or also alternately. It should be understood that a detailed design of the overall plant lies within the ability of the person skilled in the art. Subsequently, the briquette mixture 6 is pressed into briquettes 1 in the briquetting devices 7 and/or in the briquetting presses 23, so that briquettes 1 with a calorific value of 5 MJ/kg to 30 MJ/kg and with a maximum copper content of 0.1 wt % to 20 wt % are produced. In particular, the briquettes 1 can have a calorific value of 8 MJ/kg to 25 MJ/kg, preferably of 11 MJ/kg to 18 MJ/kg. Further, it may be the case that the briquettes 1 have a maximum copper content of 0.3 wt % to 10 wt %, preferably of 0.5 wt % to 3 wt %. Preferably, the briquette 1 is thermostable up to a temperature of 400° C. The briquette 1 can further, preferably at least essentially, be cylindrically shaped. The length of the briquette 1 and the diameter of the briquette 1 are preferably essentially identical. Yet the briquette 1 may also, preferably at least essentially, be cubically shaped, wherein the length and the width of the briquette 1 are preferably essentially identical. The side length(s) of the briquette 1 and/or the diameter of the briquette 1 can be from 10 mm to 200 mm, preferably from 20 mm to 150 mm, particularly preferably from 50 mm to 120 mm. It may also be advantageous if a proportion of length of the briquette 1 to diameter of the briquette 1 and/or of length of the briquette 1 to the width of the briquette 1 is a maximum of 0.3 to 5, preferably a maximum of 0.5 to 3, particularly preferably a maximum of 0.7 to 2.

The finished briquettes 1 can be conveyed out of the briquetting presses 23 into one or multiple storage means 22 and/or silos configured with load cells 24. From these silos and/or from the briquetting device 7, the briquettes 1 are, continuously or discontinuously, placed into a reactor 12 of a reactor plant 20. Of course, it would also be conceivable that the briquettes 1 are conveyed directly, i.e. without intermediate storage, from the briquetting devices 7 into the reactor 12. The briquettes 1 can be heated or cooled after pressing. Such a heating or cooling operation can either take place in the plant area between the briquetting device 7 and the storage means 22 or in the conveying route between the storage means 22 and the reactor 12. Of course, it is also conceivable that any and all plant areas between the briquetting device 7 and the reactor 12 are heated or cooled. In addition to the briquettes 1, also various additives 17, as well as a coarse fraction 18, can be charged into the reactor 12. In the reactor 12 and/or in a separation furnace 40 downstream of the reactor 12, the briquettes 1, the additives 17, as well as the coarse fraction 18, are melted into a liquid slag phase 13 and into a liquid metal-containing phase 14.

The briquette mixture 6 is composed such that the calorific value of the waste material 2 contained therein is so high that the at least one metal contained therein 3 is melted in a combustion in the reactor 12 during an ongoing process together with other briquettes 1 without adding other fuels or without energy input. A composition of the briquette mixture 1, or the calorific value of the briquette mixture 6, is continuously adapted to process parameters of the reactor 12. The process parameters can be, for example: the temperature of a flue gas in a post-combustion plant downstream of the reactor 12, the oxygen content of this flue gas or the composition of this flue gas. Such a continuous measurement of process parameters, as well as a control of the process on the basis of the process parameters, can be done with the help of a control 26. The overall plant can be configured with a central control 26, which enables a monitoring, measurement, control and regulation of individual plant areas. Yet it may also be the case that the main plant areas, or individual plant areas, have a special and/or separate control 26.

FIG. 2 shows another simplified schematic representation of a system, in which a preferred method can be carried out.

It is shown there in an overall process and/or in an overall plant how briquettes 1 produced in accordance with the method are used and/or prepared in a reactor plant 20.

Shredder light fractions as a present example of a waste material 2 containing metal 3 and other substances, whose metal content is to be essentially recovered, are initially introduced into a stock bunker 27 in order to be processed further from there. From the stock bunker 27, the waste material 2 is supplied, via conveyor screws 28 and suchlike, to a briquetting press 23 configured as a piston compressor 29, where the waste material is compacted 2 into briquettes 1. In terms of metal 3, the shredder light fractions can contain, in particular, copper, lead, tin, zinc, nickel and/or noble metals.

In a specific plant, for example four briquetting presses 23 configured as piston compressors 29 can compact and briquet about 10 tons of shredder light fractions per hour.

The briquettes 1 are subsequently transported, via a scale 30, into a dosing bunker 31 in order to be introduced, from there, into a melting reactor 33 via a charging lance 32. In addition to the briquettes 1, also air 43 is introduced into the melting reactor 33 in order to generate a reactive mixture inside the melting reactor 33. The introduction of the briquettes 1 takes place batchwise, i.e. in stages.

Before the briquettes 1 are introduced into the melting reactor 33, the melting reactor 33 is heated up, for example to 1200° C. to 1250° C. By compacting the waste material 2 into briquettes 1, it can be adjusted with great precision how much organic material 4 is introduced into the interior of the melting reactor 33. To that end, for example a content of 35% to 50% organic material 4 of the introduced mass has proven successful for an autothermal reaction with the participation of the air and pyrolysis gases supplied via a separate compressed-air lance 34.

The autothermal reaction can be stabilized by controlling the quantity of supplied air and pyrolysis gases, wherein it is of essential importance, to that end, to know how much organic material 4 participating in the reaction is located in the melting reactor 33. Only as much air as is needed for the reaction to take place in the melting reactor 33, i.e. for the organic material 4 and the pyrolysis gases to burn, is supplied. The supply of air, however, is limited in order not to have all pyrolysis gases directly combust and not to overheat the melting reactor 33. This reaction can proceed in the melting reactor 33, for example over 5 to 5.5 hours, without external firing, and a bath of liquid slag 13 and liquid metal 14 will form in the interior of the melting reactor 33 in this manner.

Hot process gases 44 are generated during the autothermal reaction, which hot process gases 44 are extracted via an extraction hood 35 and supplied to a boiler 37 via a post-combustion chamber 36, in which boiler 37 steam can be generated in the usual manner, which steam can be used for generating electric energy via a turbine 38. The steam can alternatively and additionally be used in local and remote district heating distribution networks.

After the reaction in the melting reactor 33 has proceeded as completely as possible, the melting reactor 33 can be poured out and its liquid content conveyed further via a transport line 39. Preferably, the bath of liquid slag 13 and liquid metal 14 is therefore supplied to a separation furnace 40, which separation furnace 40 can be realized, for example, as a drum-type furnace, and which can have an internal temperature of, for example, 1200° C. to 1250° C. As opposed to the melting reactor 33, the separation furnace 40 is fired externally in order to reach and maintain its temperature, as no reaction is to take place inside it any longer. After the melting reactor 33 has been emptied, it can be filled with another charge of waste material 2.

In the separation furnace 40, a separation of the slag phase 13 from the metal phase 14 can take place over a time span of, for example, equally 5 to 5.5 hours. Gravimetric separation is favorable to that end, as the slag phase 13 has a density of about 3 t/m$^3$ to 3.5 t/m$^3$, while the metal phase 14 has a density of about 8 t/m$^3$, wherein these values are only exemplary and will change from material to material, of course. In case of different densities of the two or more phases, the two or more phases will isolate from one another in layers in the separation furnace 40.

In the separation furnace 40, an adjusting of the slag can take place over a time span of, for example, 3 hours to 4 hours, and the slag can then be granulated over a time span of, for example, 2 hours to 3 hours, and be removed from the separation furnace 40 via a slag output line 41.

Preferably subsequently, the metal 3 can be removed from the separation furnace 40 via a metal output line 42 and therefore recovered. The metal 3 can be, for example, in the form of a liquid metal phase 14, for example copper phase, which can be enriched with other metals or heavy metals such as lead, tin, zinc, nickel and/or noble metals.

The exemplary embodiments show possible embodiment variants, wherein it should be noted in this respect that the disclosure is not restricted to these particular illustrated embodiment variants of it, but that rather also various combinations of the individual embodiment variants are possible and that this possibility of variation owing to the teaching for technical action provided by the present disclosure lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

Any and all specifications of value ranges in the description at issue are to be understood to comprise any and all sub-ranges of same, for example the specification 1 to 10 is to be understood to mean that any and all sub-ranges starting from the lower limit 1 and from the upper limit 10 are comprised therein, i.e. any and all sub-ranges start at a lower limit of 1 or larger and end at an upper limit of 10 or less, e.g. 1 to 1.7, or 3.2 to 8.1, or 5.5 to 10.

Finally, as a matter of form, it should be noted that for ease of understanding of the structure, elements are partially not depicted to scale and/or are enlarged and/or are reduced in size.

LIST OF REFERENCE NUMBERS 1 briquette
2 waste material
3 metal
4 organic material
5 first fraction
6 briquette mixture
7 briquetting device
8 fine fraction
9 second fraction
10 lint fraction
11 mineral material
12 reactor
13 slag phase 14 metal-containing phase
15 briquetting plant
16 charging plant
17 additive
18 coarse fraction
19 other waste material
20 reactor plant
21 conveying means
22 storage means
23 briquetting press
24 load cell
25 waste preparation plant
26 control
27 stock bunker
28 conveyor screw
29 piston compressor
30 scale
31 dosing bunker
32 charging lance
33 melting reactor
34 compressed-air lance
35 extraction hood
36 post-combustion chamber
37 boiler
38 turbine
39 transport line
40 separation furnace
41 slag output line
42 metal output line
43 air
44 process gas

The invention claimed is:

1. A method for producing briquettes from a waste material comprising the steps:
provisioning a waste material which waste material comprises at least one metal and at least one organic material,
mechanically preparing the waste material in a single or multiple stages and separating at least one first fraction from the waste material,
producing a briquette mixture containing the at least one first fraction wherein the at least one first fraction has a calorific value of 0 MJ/kg to 30 MJ/kg,
adjusting a calorific value of the briquette mixture by varying at least the first fraction, and
introducing the briquette mixture into a briquetting device and pressing the briquette mixture into briquettes, so that briquettes with a calorific value of 5 MJ/kg to 30 MJ/kg and with a maximum copper content of 0.1 wt % to 20 wt % are produced.

2. The method according to claim 1, wherein the at least one first fraction is provisioned as a fine fraction, which fine fraction has predominantly components with a maximum grain size of less than 15 mm.

3. The method according to claim 1, wherein an at least one second fraction is added to the briquette mixture, which second fraction has a calorific value which is different from the first fraction.

4. The method according to claim 3, wherein at the second fraction is a lint fraction or comprises a lint fraction.

5. The method according to claim 1, wherein the waste material comprises at least one mineral material.

6. The method according to claim 1, wherein the briquettes are produced with a calorific value of 8 MJ/kg to 25 MJ/kg.

7. The method according to claim 1, wherein the briquettes are produced with a maximum copper content of 0.3 wt % to 10 wt %.

8. A method for producing briquettes from a waste material, comprising the steps of:
providing a waste material having at least one metal and at least one organic material;
mechanically preparing the waste material and separating at least one first fraction from the waste material;
producing a briquette mixture containing the at least one first fraction, wherein the at least one first fraction has a calorific value of 0 MJ/kg to 30 MJ/kg;
adjusting a calorific value of the briquette mixture by varying at least the first fraction, and
introducing the briquette mixture into a briquetting device and pressing the briquette mixture into briquettes, so that briquettes with a calorific value of 5 MJ/kg to 30 MJ/kg and with a copper content of 0.1 wt % to 20 wt % are produced.

9. The method according to claim 8, wherein the briquettes are, continuously or discontinuously, placed from the briquetting device into a reactor.

10. The method according to claim 9, wherein the briquette mixture is composed such that the calorific value of the waste material contained therein is so high that the at least one metal contained therein is melted in a combustion in the reactor during an ongoing process together with other briquettes without adding other fuels or without energy input.

11. The method according to claim 8, wherein a composition of the briquette mixture, or the calorific value of the briquette mixture, is adapted continuously to process parameters of a reactor.

12. A briquette made of a waste material, which waste material comprises at least one metal and at least one organic material, and which the briquette is produced using a method according to claim 8, wherein:
the briquette is produced from a briquette mixture containing at least one first fraction of the waste material, which at least one first fraction has a calorific value of 0 MJ/kg to 30 MJ/kg, and the briquette has a calorific value of 5 MJ/kg to 30 MJ/kg and a maximum copper content of 0.1 wt % to 20 wt %.

13. The briquette according to claim 12, wherein the at least one first fraction is a fine fraction or comprises a fine fraction which fine fraction has predominantly components with a maximum grain size of less than 15 mm.

14. The briquette according to claim 13, wherein the briquette mixture contains a second fraction, which second fraction has a calorific value which is different from the first fraction.

15. The briquette according to claim 14, wherein the second fraction is a lint fraction or comprises a lint fraction.

16. The briquette according to claim 15, wherein a proportion of fine fraction to lint fraction is a maximum of 0.1 to 6.

17. The briquette according to claim 8, wherein the waste material comprises at least one mineral material.

18. A method for producing briquettes from a waste material, comprising the steps of:
providing a waste material having at least one metal and at least one organic material;
mechanically preparing the waste material and separating at least one first fraction from the waste material;
producing a briquette mixture containing the at least one first fraction, wherein the at least one first fraction has a calorific value of 0 MJ/kg to 30 MJ/kg;

adjusting a calorific value of the briquette mixture by varying at least the first fraction; and introducing the briquette mixture into a briquetting device and forming the briquette mixture into briquettes, so that briquettes with a calorific value of 8 MJ/kg to 25 MJ/kg and with a copper content of 0.1 wt % to 20 wt % are produced.

19. The briquette according to claim 18, wherein the briquette has a maximum copper content of 0.3 wt % to 10 wt %.

20. The briquette according to claim 18, wherein the briquette mixture is composed such that the calorific value of the waste material contained therein is so high that the at least one metal contained therein is melted in a reactor during an ongoing process together with other briquettes without adding other fuels or without energy input.

* * * * *